United States Patent [19]

Detweiler

[11] Patent Number: 4,630,642
[45] Date of Patent: Dec. 23, 1986

[54] CHECK VALVE AND WATER INJECTION SYSTEMS AND FUEL SYSTEMS UTILIZING THE SAME

[75] Inventor: Charles A. Detweiler, Durand, Mich.

[73] Assignee: Tom McGuane Industries, Inc., Madison Heights, Mich.

[21] Appl. No.: 677,289

[22] Filed: Dec. 3, 1984

[51] Int. Cl.$^4$ .............................................. F16K 31/12
[52] U.S. Cl. ..................... 137/506; 137/510; 137/614.2
[58] Field of Search ................. 137/506, 510, 614.2, 137/614.21, 512.3

[56] References Cited

U.S. PATENT DOCUMENTS

| 2,771,321 | 11/1956 | Alric | 137/506 |
| 2,969,088 | 1/1961 | Kramer | 137/614.2 |
| 4,201,243 | 5/1980 | Martin | 137/512.3 |
| 4,235,211 | 11/1980 | Sugaya | 137/506 |
| 4,537,387 | 8/1985 | Danby | 137/510 |

FOREIGN PATENT DOCUMENTS 1055758  1/1967  United Kingdom ............... 137/510

Primary Examiner—Douglas Hart
Attorney, Agent, or Firm—Barnes, Kisselle, Raisch, Choate, Whittemore & Hulbert

[57] ABSTRACT

For use in a turbocharger system wherein exhaust flow from the engine is caused to rotate an impeller and charge the intake of the engine with compressed air, a water injection system comprising a water reservoir, a first line connecting the reservoir to the intake from a point above the liquid in the reservoir, a second line extending from below the level of liquid in the reservoir to the intake of the impeller and a check valve in the second line. The check valve includes a valve body having an inlet and an outlet, a seat separating the inlet and the outlet, a valve member, and a spring external of the valve member and of the flow of water through the inlet, outlet and seat yielding urging the valve member into engagement with the seat. The check valve may also be utilized in a fuel system wherein a fuel pump directs fuel to electronically controlled fuel nozzles. The check valve is placed in the line between the fuel pump and the fuel nozzle.

6 Claims, 16 Drawing Figures

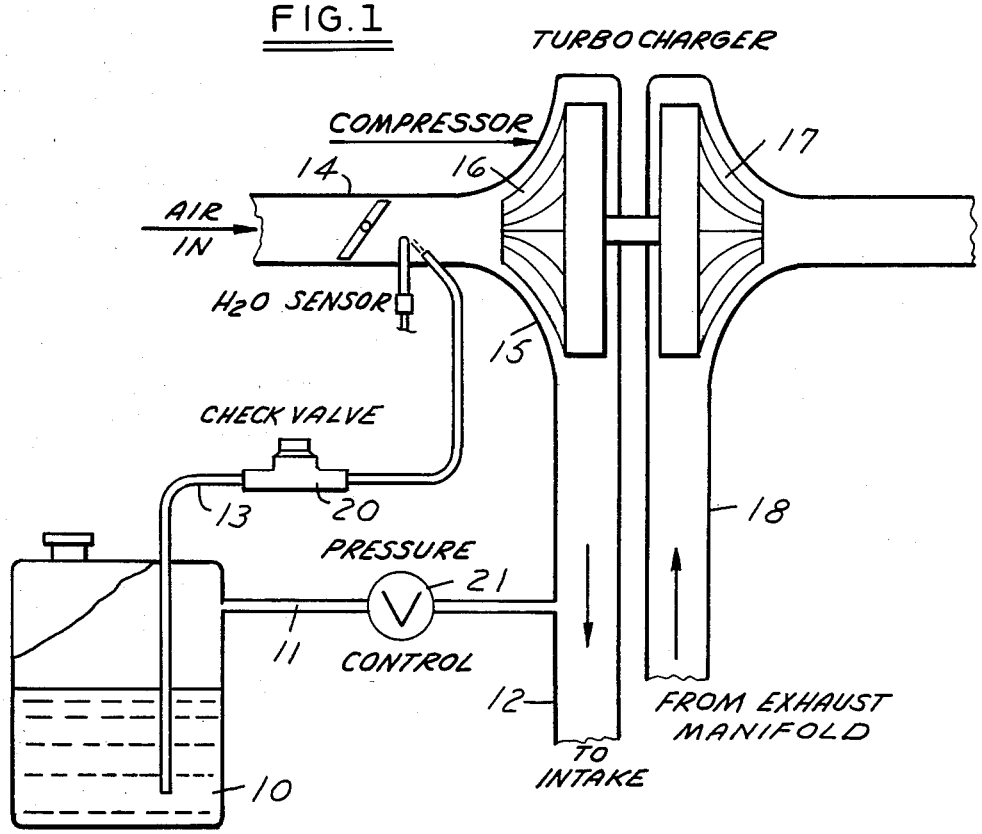
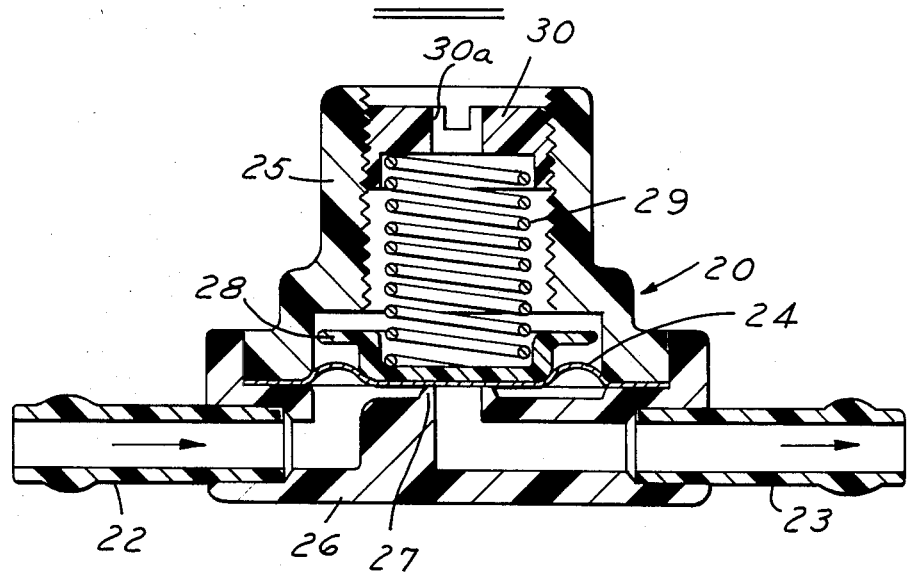

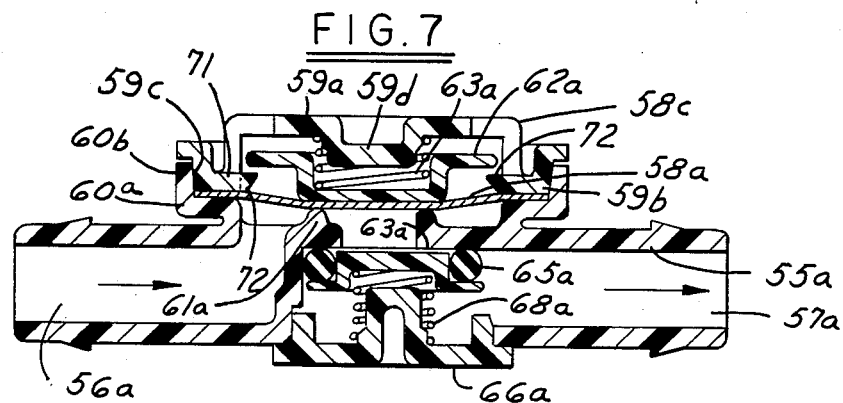
FIG. 7
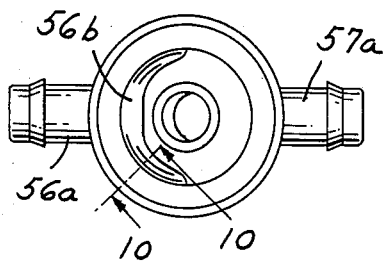
FIG. 8
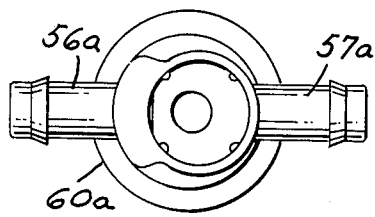
FIG. 9
FIG. 10
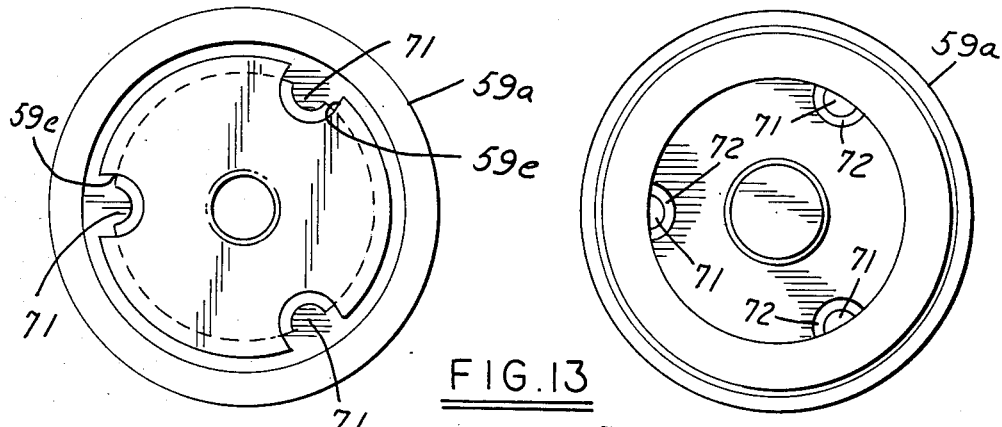
FIG. 11
FIG. 12
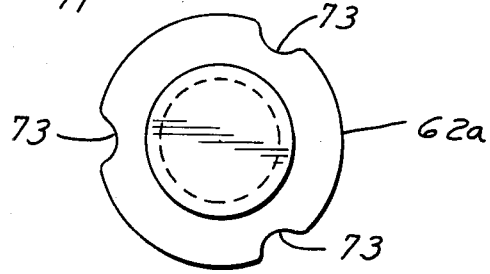
FIG. 13

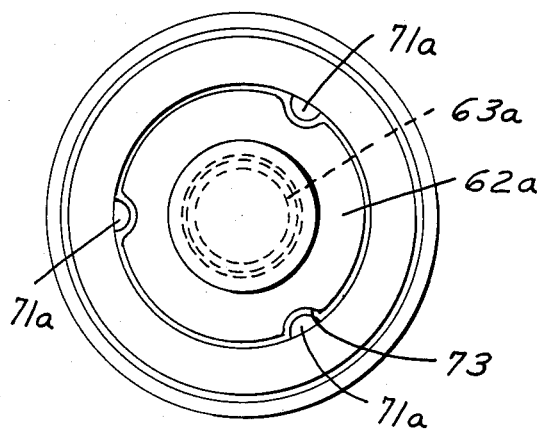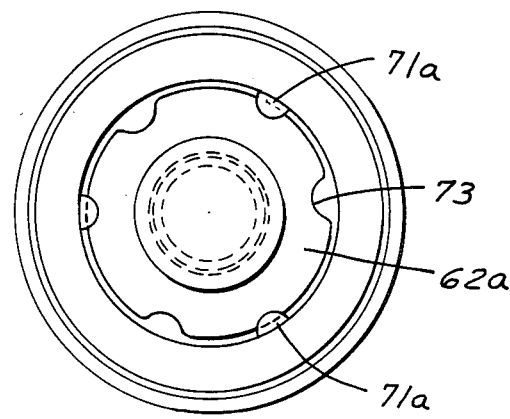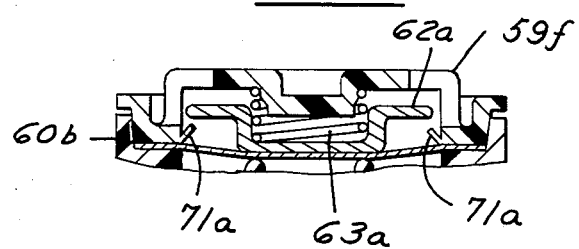

CHECK VALVE AND WATER INJECTION SYSTEMS AND FUEL SYSTEMS UTILIZING THE SAME

This invention relates to turbocharged engines and particularly water injection systems for turbocharged engines.

BACKGROUND AND SUMMARY OF THE INVENTION

It has heretofore been suggested that water or a mixture of water and alcohol injected into an air/fuel mixture will increase the octane rating of the mixture to produce more power without undesired detonation.

In one type of system that has heretofore been suggested, air pressure from the turbocharger is directed to a water reservoir and the pressure of the air forces the water to be injected to the intake of the engine. In another type, the pressure of the air electrically energizes a pump to pump water into the intake.

One of the problems with respect to such systems is to provide a control such that water will only be injected when the pressure of the air in the intake due to supercharging exceeds a predetermined amount.

Another problem which arises is to prevent vacuum in the intake from drawing liquid into the intake when water is not being injected.

Accordingly, among the objects of the invention are to provide a valving system which will effectively produce injection when the pressure exceeds a predetermined quantity; wherein the valve is unaffected by the liquid being injected; wherein the valve system will also prevent liquid from the reservoir from being drawn into the intake when the pressure does not exceed a predetermined amount.

In fuel injection systems, it has become common to provide an electric fuel pump in a fuel tank which delivers fuel at high pressure to the engine fuel metering system. Conventionally a fuel pressure regulator controls the pressure at the fuel nozzles by allowing a portion of the fuel to return to the fuel tank. The placement of a check valve in the return line to the tank prevents fuel from flowing out of the tank through the return line in case the return line is ruptured during an accident. It has also been proposed that a check valve be provided in the pump discharge line to prevent fuel from returning to the tank when the pump is shut off and maintain fuel pressure in the system between the check valve and the fuel pressure regulator. The check valve also functions to prevent fuel from flowing out of the fuel line in case the fuel line is ruptured during an accident. One of the problems with conventional check valves utilized in such systems is that a substantial pressure is required to open the valve thereby requiring a pump having a greater capacity than is normally required in the fuel metering system. Such a high pressure drop across the conventional check valve may also cause foaming of the fuel under high temperature conditions.

Accordingly among the further objectives of the present invention are to provide a valve which requires minimal pressure to open and prevents reverse flow when the pressure is present in the fuel and the pump is not operating.

DESCRIPTION OF THE DRAWINGS

FIG. 1 is a schematic diagram of a water injection system for turbocharged engines embodying the invention.

FIG. 2 is a longitudinal sectional view of a valve utilized in the system.

FIG. 7 is a longitudinal sectional view of a modified form of valve which may be utilized in the fuel injection system.

FIG. 8 is a top plan view of the body of the valve shown in FIG. 7, parts being removed.

FIG. 9 is a bottom plan view of the valve shown in FIG. 7, parts being removed.

FIG. 10 is a fragmentary sectional view on an enlarged scale taken along the line 10—10 in FIG. 8.

FIG. 11 is a top plan view of a cover member utilized in the valve.

FIG. 12 is a bottom plan view of the cover member.

FIG. 13 is a bottom plan view of a diaphram spring retainer utilized in the valve.

FIG. 14 is a fragmentary sectional view of a further modified form of valve.

FIG. 15 is a plan view of the cover utilized in FIG. 14.

FIG. 16 is a bottom plan view of the cover.

DESCRIPTION

Figure 3:
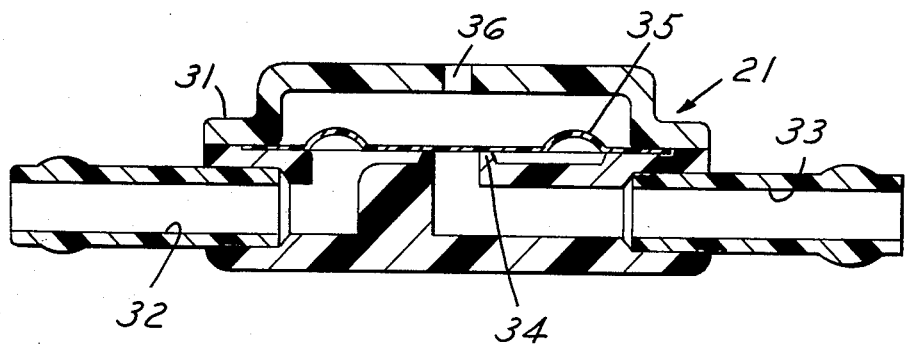
FIG. 3 is a longitudinal sectional view of another valve utilized in the system.

Referring to FIG. 1, the water injection system embodying the invention comprises a container 10 which is connected by a first line 11 that extends from a point above the liquid in the reservoir 10 to the intake 12 that extends to the manifold and, in turn, the carburetion system of the engine. The water injection system further includes a second line 13 that extends from below the level of liquid in the reservoir to the air intake of the housing 15 that extends to and surrounds the impeller 16 of the turbocharger. Upon rotation by the rotor 17 of the turbocharger due to exhaust pressure extending through duct 18 from the exhaust manifold of the engine the impeller 16 pressurizes the air from the air intake 14 and directs it to the manifold intake 12.

The water injection system further includes a check valve 20 in the second line 13 that functions to prevent back flow through the system when the pressure of the liquid falls below a certain value. A pressure control valve is provided in the first line 11 and is operable to permit manifold pressure to flow to the reservoir 10 from the intake 12 when the pressure exceeds a predetermined amount and to return the reservoir to atmospheric pressure when the pressure in the manifold intake 12 drops to zero thereby preventing vacuum from the manifold intake 12 from reaching the reservoir 10 and drawing liquid through the line 11 to the manifold intake 12.

Referring to FIG. 2, check valve 20 is constructed and arranged such that the operating parts are not adversely affected by the liquid in the reservoir. More specifically, the valve 20 comprises a body made of plastic and comprising two pieces including openings 22, 23. The opening 22 extends generally radially inwardly and axially toward a diaphragm 24 that is clamped between the two parts 25, 26 of the body 21. Opening 23 extends generally radially and then axially and is surrounded by a seat 27 against which the diaphragm 24 operates. A pressure plate 28 is yieldingly urged by a compression spring 29 against the diaphragm 24 so that the diaphragm functions as a valve member. If desired, an adjustable stop 30 is provided for varying and calibrating the pressure at which the valve will function. It can be seen that the spring 29 and plate 28 are external to the flow of liquid and therefore are not adversely affected thereby. The side of the diaphragm 24 opposite the seat is vented to the exterior of the body through an opening 30a.

Referring to FIG. 3, the pressure control valve 21 is similar to the valve 20 except that it does not require a spring. The valves 20, 21 can thus be made of interchangeable parts. More specifically, valve 21 comprises a body 31 having an inlet 32 extending radially and axially and an opening 33 also extending radially and axially to a seat 34 against which a diaphragm 35 functions. The other side of the diaphragm is vented to the atmosphere through an opening 36.

When the pressure in the manifold intake 12 is built up due to operation of the turbocharger, the diaphragm 24 of valve 20 moved away from the seat 34 permitting air to be supplied to the reservoir 10 and cause the liquid in the reservoir 10 to pass to the intake 14 when the pressure increases beyond that established by the check valve 20. When the intake manifold pressure drops to zero, the diaphragm 35 of pressure control valve 21 will permit pressure in the reservoir 10 to bleed off into the intake of the manifold 12. When the pressure in the manifold drops below atmospheric, the diaphragm 35 will seat against the seat 34 preventing the vacuum in the manifold intake from drawing liquid from the reservoir.

Figure 4:
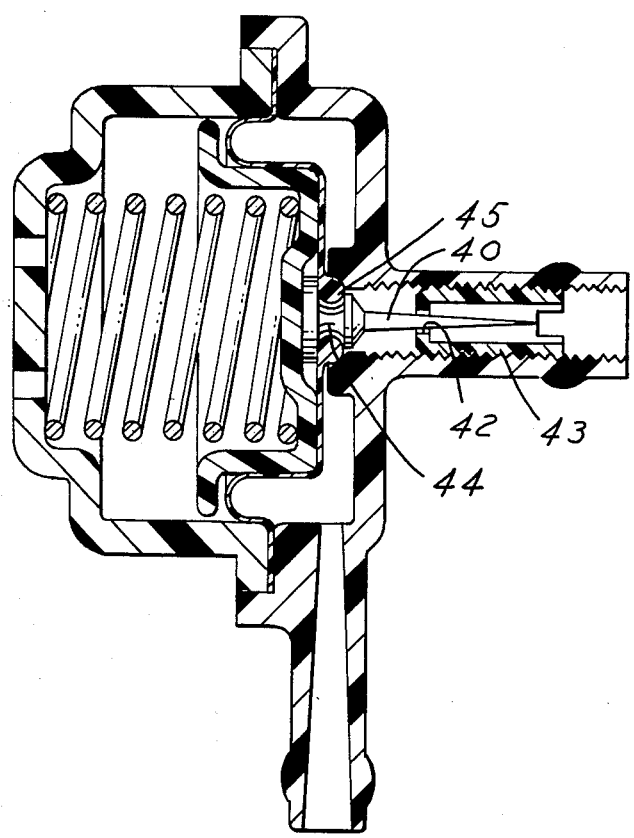
FIG. 4 is a longitudinal sectional view of a modified form of a valve which may be utilized in the system.

In the form of check valves shown in FIG. 4, a metering element or needle 40 is mounted on the diaphragm 24a and projects axially into the opening 41 defined by seat 27 to cooperate with an orifice 42 of an orifice member 43 which is adjustably threaded into the opening. Needle 40 has an annular concave seat 44 against which an integral O-ring 45 of diaphragm 35a seals.

The needle 40 and orifice are shaped to obtain the desired metered flow of liquid from the reservoir.

Figure 5:
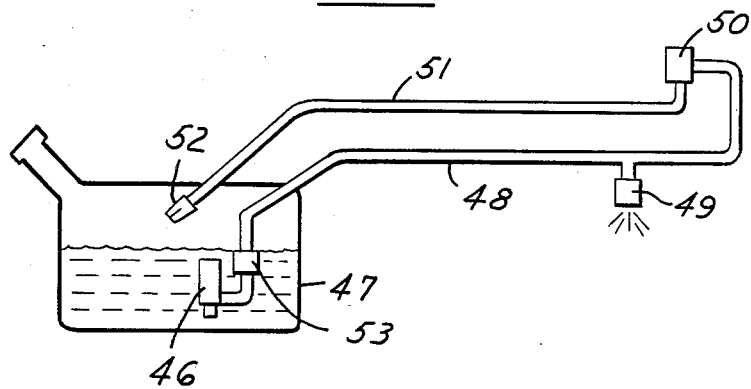
FIG. 5 is a schematic diagram of a fuel injection system embodying the invention.

Referring to FIG. 5, the valve shown in FIGS. 2, 3 and 4 can also be utilized in a fuel injection system wherein an electric fuel pump 46 functions to deliver fuel from a tank 47 through a line 48 to electronically controlled fuel nozzles 49. The pressure of fuel supplied is controlled by a fuel pressure regulator 50 that functions to return part of the fuel flow through a line 51 and a check valve 52 to the tank 47. In accordance with the invention a check valve 53 in the line from the electric fuel pump to the nozzles is of the type shown in FIGS. 2, 3 and 4. When the fuel pressure from the pump acts on the diaphragm of any of these valves it overcomes the spring force, the diaphragm lifts and permits fuel flow through the check valve. When the pump stops, the spring returns the diaphragm to its position against the seat and prevents reverse flow through the valve.

Figure 6:
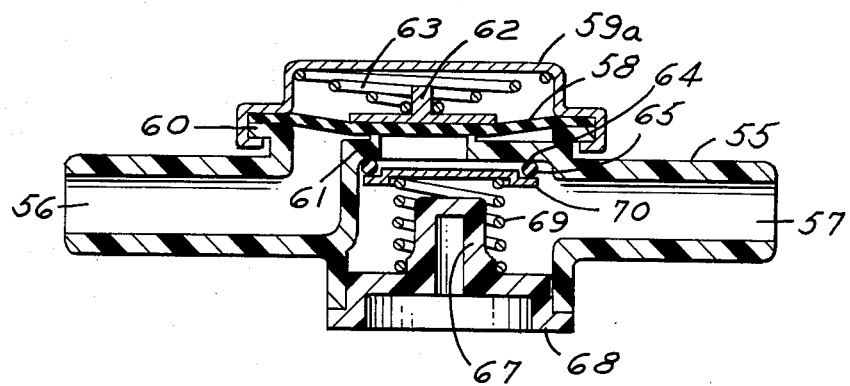
FIG. 6 is a longitudinal sectional view of a valve utilized in the fuel injection system.

In the form of valve shown in FIG. 6, the valve comprises a body 55 made of plastic and comprises two pieces including openings 56, 57. Opening 56 extends generally radially inwardly and axially toward a diaphragm 58 that is clamped between the two parts 59, 60 of the body 55. Opening 57 extends generally radially and axially and is surrounded by a seat 61 against which the diaphragm operates. A pressure plate 62 is yieldingly urged by a compression spring 63 against the diaphragm 58 so that the diaphragm 58 functions as a valve member. The diaphragm functions as heretofore described. In this form a second seat 64 is provided on the opposite side of the first seat by an O-ring 65 on integral guide 67 of a retainer 68 and a light spring 69 yieldingly urges a second pressure plate 70 and associated O-ring 65 into engagement with the seat.

When the fuel pump is energized, the diaphragm lifts and, in addition, the second check valve formed by the O-ring is forced away from the second seat to permit flow toward the outlet and prevent return flow. The force of the second spring is set for a very low pressure so that the valve will open even though there is fuel pressure present in the fuel line. For example, the second valve may require a minimal pressure of 0.1–0.2 p.s.i. when fuel line pressure is 30 p.s.i.

A modified form of valve shown in FIGS. 7–13 is similar to the valve shown in FIG. 6 and, in the interest of clarity, corresponding parts have been designated the same reference numerals and the suffix "a".

As shown, the body 55a is made of plastic and comprises openings 56a, 57a. The opening 56a extends generally radially inwardly and axially toward a diaphragm 58a that is clamped between a flange 59b on a cover 59a and a flange 60a on the body 55a. The flange 60a includes an axial annular wall 60b and the cover 58a has a complementary wall 59c that extends within the wall 60b and is ultrasonically bonded thereto. The central portion 59d of the cover 59a is in the form of a cap or depression and has circumferentially spaced openings 59e that extend to the atmosphere and expose the outer side of the diaphragm 58a to ambient pressure. A pressure plate 62a is yieldingly urged downwardly by a spring 63a telescoped over depression 59d in the cover 59a to urge the diaphragm 58a against the seat 61a.

A second seat 64 is provided on the opposite side of the first seat 61a. An O-ring 65a is yieldingly urged against the second seat 64a by a second pressure plate 70 which, in turn, is urged by a spring 68a interposed between the pressure plate and the plastic retainer.

In order to facilitate assembly, the upper pressure plate 62a and cover 59a are constructed and arranged to form a subassembly which is then inserted in the body 55a and the cover plate 59a is thereafter ultrasonically welded to the body 55a. In order to achieve this, the cover plate 59a is formed with a plurality of circumferentially spaced radially inwardly extending projections 71 that are semi-circular in plan view and have axial surfaces 72 extending upwardly and inwardly and the pressure plate 62a is provided with circumferentially spaced radially inwardly extending notches 73. In assembly, the spring 63a is placed in position on the cover plate 59a and the pressure plate 62a is then positioned so that the notches 73 are in registry with the projections 71. The pressure plate 62a is moved axially inwardly and rotated to move the notches 73 past the projections 71 so that when the axial force on the plate 62 is released the pressure plate 62a will be locked in the cover 59a so that the subassembly can be handled readily.

As further shown in FIG. 7, the inlet 56b to the underside of the diaphragm is enlarged in a circumferential direction away from the axial portion of the passage 56a so that fuel will readily flow past the seat when the diaphragm is moved upwardly.

In the form of valve shown in FIGS. 14–16, the arrangement of the subassembly of the cover and pressure plate is achieved by providing flexible fingers 71a of thin cross section of the inner periphery of the cover plate 59f so that the pressure plate 62b can be readily snapped past the fingers 71a to provide the subassembly.

We claim:

1. A check valve including
   a valve body having an inlet and an outlet,
   a seat separating the inlet and the outlet,
   a valve member,
   and yielding means external of the flow of the inlet, outlet and seat yieldingly urging the valve member into engagement with the seat,
   said valve body being made of plastic material,
   said valve body including a peripheral flange,
   a cover being made of plastic,
   said cover having a complementary flange overlying said flange,
   a diaphragm interposed between said flanges,
   said body including an annular wall surrounding said flange thereon,
   said cover including a complementary annular wall ultrasonically welded to said annular wall of said body,
   said body having an integral annular set,
   a pressure member associated with said diaphragm on the side opposite said seat,
   yielding means comprising a spring interposed between said cover and said pressure member,
   said cover and said pressure member having interengaging means defining a subassembly preventing movement of said pressure member axially out of said cover so that the subassembly can be handled before the cover is ultrasonically welded to the body.

2. The check valve set forth in claim 1 wherein said valve includes a second seat, a valve member, and yielding means urging said valve member against said second seat, said second seat being positioned relative to said first set to prevent flow from the outlet to the inlet when the second valve member is in engagement with said second seat.

3. The check valve set forth in claim 1 wherein said first and second seats are annular.

4. The check valve set forth in claim 3 wherein said second valve seat comprises an O-ring.

5. The check valve set forth in claim 1 wherein said interengaging means comprises a plurality of circumferentially spaced projections extending radially inwardly from the flange of said cover,
   said pressure member having a plurality of circumferentially spaced notches positioned such that the pressure member can be inserted within said cover by aligning said notches with said projections, moving said pressure member axially inwardly against the action of said spring, and rotating said pressure member to move the notches out of registry with said projections such that the cover then is yieldingly urged against said projections.

6. The check valve set forth in claim 1 wherein said interengaging means comprises a plurality of flexible fingers extending radially inwardly and axially outwardly from said flange of said cover such that the pressure member can be inserted by moving the pressure member axially inwardly of the cover against the action of said spring to flex said fingers and past said fingers and thereafter released so that said fingers retain said pressure member against movement out of the cover.

* * * * *